(12) United States Patent
Troxell et al.

(10) Patent No.: US 11,949,730 B2
(45) Date of Patent: Apr. 2, 2024

(54) CONTEXT-AWARE INTERFACE LAYER FOR REMOTE APPLICATIONS

(71) Applicant: NETFLIX, INC., Los Gatos, CA (US)

(72) Inventors: Lyle Eban Troxell, Boulder Creek, CA (US); David Ian Krabacher, Glendale, CA (US); Cameron Langs, Studio City, CA (US); Raymond Forziati, Los Angeles, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/403,728

(22) Filed: Aug. 16, 2021

(65) Prior Publication Data
US 2023/0051572 A1 Feb. 16, 2023

(51) Int. Cl.
H04L 67/025 (2022.01)
G06F 3/0486 (2013.01)
G06F 9/54 (2006.01)
H04L 67/125 (2022.01)

(52) U.S. Cl.
CPC .......... H04L 67/025 (2013.01); G06F 3/0486 (2013.01); G06F 9/542 (2013.01); G06F 9/543 (2013.01); G06F 9/547 (2013.01); H04L 67/125 (2013.01)

(58) Field of Classification Search
CPC ... H04L 67/025; H04L 67/125; G06F 3/0486; G06F 9/542; G06F 9/543; G06F 9/547
See application file for complete search history.

(56) References Cited

U.S. PATENT DOCUMENTS

| 8,930,439 | B2 * | 1/2015 | Brakensiek | G06F 9/44 709/204 |
| 10,863,248 | B2 | 12/2020 | Loretan et al. | |
| 11,030,067 | B2 * | 6/2021 | Gustafson | G06F 18/241 |
| 11,501,255 | B2 * | 11/2022 | Mann | G06F 3/167 |
| 2006/0184540 | A1 * | 8/2006 | Kung | G06F 16/188 |
| 2017/0229102 | A1 | 8/2017 | Shewman | |
| 2018/0255362 | A1 | 9/2018 | Chittella et al. | |

OTHER PUBLICATIONS

The Evolution of Media Creation, A 10-Year Vision for the Future of Media Production, Post and Creative Technologies, Movie Labs, 56 pages.
Quickspecs, "NICE Software Desktop Cloud Visualization and EnginFrame", 6 pages.
Tanahashi et al., "An Interface Design for Future Cloud-Based Visualization Services", Nov. 2010, 6 pages.
International Search Report for application No. PCT/US2022/074020 dated Oct. 27, 2022.

* cited by examiner

Primary Examiner — Sm A Rahman
(74) Attorney, Agent, or Firm — Artegis Law Group, LLP

(57) ABSTRACT

Various embodiments of the present application set forth a computer-implemented method comprising receiving, at an endpoint device, a user input associated with a first remote application running on a workstation instance associated with the user, determining, based on a context associated with the user input, a first asset associated with the user input, and causing the workstation instance to modify an asset file in a local file system of the workstation instance, wherein the asset file corresponds to at least a portion of the first asset.

20 Claims, 9 Drawing Sheets

CONTEXT-AWARE INTERFACE LAYER FOR REMOTE APPLICATIONS

BACKGROUND

Field of the Various Embodiments

Embodiments of the present disclosure relate generally to distributed computing systems and, more specifically, to a context-aware interface layer for remote applications.

Description of the Related Art

Distributed computing systems include many different hardware and software components that operate to provide a variety of services to clients of the distributed computing systems. For example, one distributed computing system executing video production services could enable various endpoint devices to access data stored in remote data stores and modify data using a suite of digital content creation (DCC) applications.

In various circumstances, an endpoint device may run multiple DCC applications simultaneously to perform different tasks. For example, a user may have an endpoint device run multiple instances of an image-editing application to perform comprehensive editing tasks, or run video editing application and a video encoding application in parallel to perform a group of different video preparation tasks. Oftentimes, the endpoint devices have limited processing and memory resources and thus have limitations in running a single complex DCC application, and have even greater difficulty in running multiple DCC applications simultaneously.

Accordingly, conventional techniques have endpoint devices to connect to remote virtual machines, such as remote workstations, that are included in the distributed computing system. The remote workstation can be used to execute programs using a collection of networked processing and memory resources. For example, a given endpoint device can connect to a virtual machine that has been allocated a configuration of processing resources and memory resources in order to operate one or more DCC applications, where the configuration changes to provide more resources when the remote workstation is running multiple DCC applications.

One drawback with such approaches for running applications in a distributed network is that some applications operating on virtual machines have limited capabilities compared to when the same applications are operating natively on an endpoint device. For example, a given DCC application may include some complex tools and interactive features that can only be performed when operating natively on the endpoint computer. As a result, users are sometimes required to run a DCC application natively on endpoint devices, where the limited technical capabilities of the endpoint device hinder the effectiveness of performing complex tasks.

Further, some DCC applications also require that the data being accessed also be native to the endpoint device, thus requiring a user to download a given digital asset onto local storage endpoint devices in order to access the full capability of the DCC application. For example, a user performing an encoding task would store a copy in local storage of the endpoint device. As a result, the conventional techniques of storing local copies of digital assets restrict the use of networked storage resources in the distributed computing system.

As the foregoing illustrates, more effective techniques for executing applications in remote workstations are needed in the art.

SUMMARY

Various embodiments of the present application set forth a computer-implemented method comprising receiving, at an endpoint device, a user input associated with a first remote application running on a workstation instance associated with the user, determining, based on a context associated with the user input, a first asset associated with the user input, and causing the workstation instance to modify an asset file in a local file system of the workstation instance, wherein the asset file corresponds to at least a portion of the first asset.

Other embodiments include, without limitation, a computer system that performs one or more aspects of the disclosed techniques, as well as one or more non-transitory computer-readable storage media including instructions for performing one or more aspects of the disclosed techniques.

The remote workstation interface application extends the capabilities of an application operating on a workstation instance that is remote to the user, improving the functionality of the application when operating on the workstation instance. In addition, by providing a uniform set of tools and capabilities over a suite of different applications, the remote workstation interface application enables a user to become familiar with the set of tools that are available for use. This improved usability results in a more-effective use of the remote applications when operated by the user. Further, the remote workstation interface application enables a user to operate multiple instances of the remote application on one or more workstation instances. Since the workstation instances have more computing resources than the endpoint device of the user, running remote applications on virtual workstations in this manner thus improves the use of the available computing resources in the distributed computing environment.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
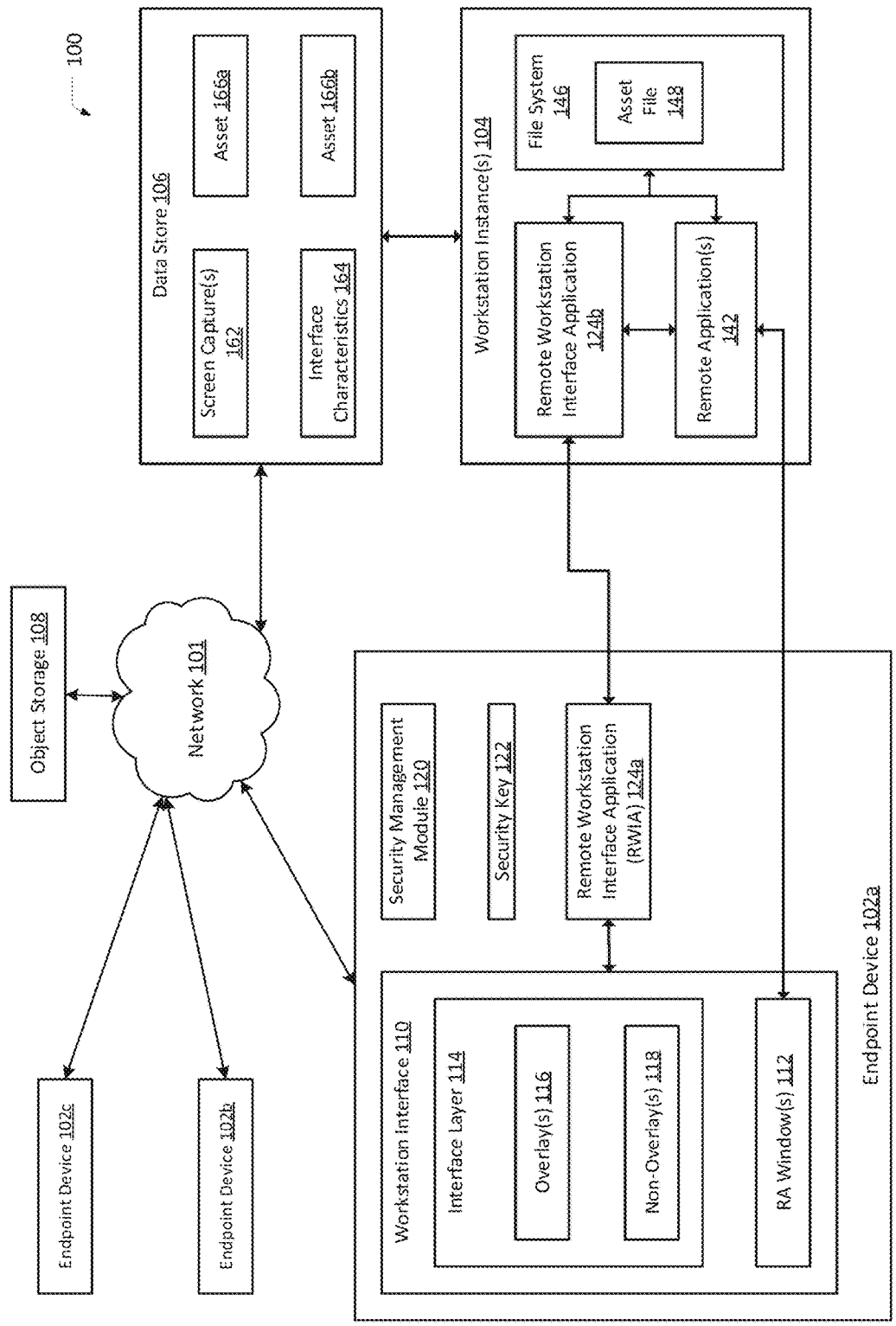
FIG. 1 illustrates a network infrastructure configured to implement one or more aspects of the present disclosure.

In the following description, numerous specific details are set forth to provide a more thorough understanding of the various embodiments. However, it will be apparent to one skilled in the art that the inventive concepts may be practiced without one or more of these specific details.

Overview

Distributed computing systems include many different hardware and software components that operate to provide a variety of services to clients of the distributed computer systems. A distributed computing system executing video production services could provide users with the ability to create, access, and modify various assets through use of various remote services. A user would perform various actions in digital content creation (DCC) applications in order to execute video production tasks. For example, a user could operate an endpoint device in order to access a video and use a video-editing application via the endpoint device to edit the video for distribution. In another example, one or more users may encode a video using instances of a video encoding application in order to prepare the video for subsequent streaming for playback.

Prior art techniques had a user perform tasks associated with video production services by accessing a virtual machine that acts as a virtual workstation. The virtual workstation runs various DCC applications necessary to perform the task, modifying assets accessed by the user. However, such techniques greatly lowered the efficiency of applications running on the virtual workstations, as various applications offered certain complex tools and capabilities (e.g., drag-and-drop interactions, accessing local files, notification windows, etc.) only when operating natively on endpoint devices. For example, a conventional virtual workstation would require that an endpoint device store a file in its local file system and mount the file to enable access by the virtual workstation. Other conventional virtual workstations would access the asset from a networked data store, where the asset remained stored at the networked data store. Because the asset was stored on a different device, a given application may not be able to provide functionalities associated with handling local files. Further, the given application may not be able to communicate with other applications also controlled by the endpoint device. As a result, users were limited in the tasks that could be effectively and efficiently performed when running an application on a virtual workstation.

In contrast, the disclosed network infrastructure and associated disclosed techniques enable a video production system to use virtual workstations to operate various DCC applications with an extended set of capabilities. A workstation interface application operating at an endpoint device generates an interface layer displayed within the workstation interface. The interface layer provides an additional context when interacting with a remote application operating on a virtual workstation. The interface layer includes overlay regions over windows displaying the application and/or one or more other regions of the workstation interface (e.g., surrounding areas that border the application windows, other windows, etc.). Upon determining that the user has made an input over a portion of the interface layer, the workstation interface application identifies contextual elements associated with the input. The contextual elements may be specific data, such as an identifier for a selected asset, menus, commands specifying how the asset is to be handled, and the set of available tools or functions for manipulating the asset. The workstation interface application also determines the applicable action that is to occur at the virtual workstation. For example, the user can drag a thumbnail image of an asset to the overlay area of an application window of a remote application in order to open the asset in the remote application. The workstation interface application detects the user input and determines the contextual elements for the action by acquiring the asset identifier for the asset and determining various actions (e.g., opening the asset as a writeable file or a read-only file) that are associated with the input. The workstation interface application transmits an indication message that includes the contextual elements to the virtual workstation.

A corresponding workstation interface application operating at the virtual workstation instance receives the indication message and responds by determining the context and enabling the action to occur at the virtual workstation. For example, to enable the application to open the asset, the workstation interface application uses the asset identifier to identify the asset and determine whether a copy of the asset is locally stored at the virtual workstation. When the workstation interface application determines that a copy of the asset is not locally stored, the workstation interface application causes a copy of the asset to be transferred to the virtual workstation. The workstation interface application then causes the application to open the copy of the asset from the local file system of the workstation instance. The workstation interface application operating at the endpoint device and the workstation interface application operating at the workstation instance may coordinate to provide additional capabilities to the application operating on the virtual machine that are similar to the capabilities of the application when running natively on the endpoint device.

The remote workstation instance application thus addresses various limitations of conventional distributed computer networks and techniques associated with virtual machines and remote services. More specifically, conventional approaches to using virtual workstation would limit the capabilities and tools that a given application running on the virtual workstation could provide due to various constraints, such as access to assets and awareness of other applications that are also running. As a result, users would either use an application on a virtual workstation with a limited set of tools, or run the same application as a native application and face performance issues due to the limited resources of the user's endpoint device. By contrast, a distributed network that uses the disclosed context-aware interface layer and workstation management techniques effectively extends the capabilities of applications operating on virtual workstations, improving the functionality of the application when operating on the virtual workstation. Further, the remote workstation interface application enables a user to more effectively operate multiple occurrences of the remote application on one or more workstation instances that have more computing resources than the endpoint device of the user, thus improving the use of computing resources available in the distributed computing environment.

Context-Aware Interface Layer for Remote Applications

FIG. 1 illustrates a network infrastructure configured to implement one or more aspects of the present disclosure. As shown, the distributed workstation system 100 that is a portion of the network infrastructure includes, without limitation, a network 101, endpoint device 102 (e.g., 102a, 102b, 102c, etc.), workstation instances 104 (e.g., 104a, 104b, 104c, etc.), a data store 106 and object storage 108. The endpoint device 102 includes a workstation interface 110, an interface layer 114, overlays 116, non-overlays 118, a security management module 120, a security key 122, and remote workstation interface application 124 (e.g., 124a, 124b, etc.). The workstation instance 104 includes remote applications 142 (e.g., 142a, 142b, etc.), a file system 146, and an asset file 148. The data store 106 includes screen captures 162, interface characteristics 164, and assets 166 (e.g., 166a, 166b, etc.).

For explanatory purposes, multiple instances of like objects are denoted with reference numbers identifying the object and additional letters identifying the instance where needed. Further, the distributed workstation system 100 includes multiple instances of devices, even when not shown. For example, the distributed workstation system 100 could include multiple screen captures 162 (e.g., 162a, 162b, etc.), asset files 148 (e.g., 148a, 148b, etc.) and/or data stores 106 (e.g., 106a, 106b, etc.) and still be within the scope of the disclosed embodiments.

In operation, the remote workstation interface application 124 included in the endpoint device 102 (e.g., 124a) provides a workstation interface 110, including an interface layer 114 and a remote application window 112 that displays the operation of the remote application 142 running on the workstation instance 104. The remote workstation interface application 124 detects a user input within the interface layer 114 and determines a context (e.g., one or more contextual elements) for the user input as the input relates to the remote application. The remote workstation interface application 124 generates and sends an indication message with the contextual elements to the workstation instance 104. A corresponding remote workstation interface application 124 (e.g., 124b) included in the workstation instance 104 determines the applicable actions that the remote application 142 and one or more other components or devices (e.g., the file system 146, the data store 106). The remote workstation interface application 124 causes the remote application 142 and the one or more other components or devices to perform the applicable actions. Performing such actions enables complex communications that the remote application 142 otherwise would not be able to perform.

The network 101 includes a plurality of network communications systems, such as routers and switches, configured to facilitate data communication between various devices in the distributed workstation system 100. Persons skilled in the art will recognize that many technically-feasible techniques exist for building network 101, including technologies practiced in deploying an Internet communications network. For example, network 101 may include a wide-area network (WAN), a local-area network (LAN), and/or a wireless (Wi-Fi) network, among others.

The endpoint device 102 (e.g., 102a, 102b, 102c, etc.) includes one or more processors and memory subsystems. The processor may run user processes (e.g., the remote workstation interface application 124a, the workstation interface 110, the security management module 120, etc.) that enable the user to complete various tasks. The endpoint device 102 is connected to the network 101 via one or more communications channels that transport large files, objects, and/or other messages between components. For example, the remote workstation interface application 124a could communicate with object storage 108 in order to access objects stored in the object storage 108 via streaming and/or download. In some embodiments, one or more user processes may be installed and run by a workstation instance (e.g., the workstation instance 104 may run one or more digital content creation applications as remote applications 142).

The workstation interface 110 includes one or more windows that display operations performed by the one or more workstation instances 104. The workstation interface 110 includes one or more remote application windows 112 and the interface layer 114. The interface layer 114 includes one or more overlay areas ("overlays") 116 and/or one or more non-overlay areas ("non-overlays") 118. In operation, the remote workstation interface application 124a causes the endpoint device 102a to generate the workstation interface 110 and responds to user inputs within the workstation interface 110. In some embodiments, the workstation interface 110 may include a plurality of connected windows, such as one or more remote application windows 112 (e.g., separate windows for different applications, separate windows for different instances of the same applications, etc.) and an interface layer 114 that enable additional tools and capabilities for the remote applications 142.

In various embodiments, the remote workstation interface application 124a may enable communications between different portions of the workstation interface 110. In some embodiments, the remote workstation interface application 124a may respond to an action performed in one window of the interface by causing a notification window to be displayed in a different window.

The remote application (RA) window 112 (e.g., 112a, 112b, etc.) provides a view of the remote application 142 as the remote application is operating at the workstation instance 104. In various embodiments, the endpoint device 102 and/or the workstation instance 104 can use a remote display protocol to display data provided by the remote application 142. For example, the distributed workstation system 100 could employ a particular technology protocol, such as Teradici PC over IP (PCoIP), RemoteFX, Microsoft RDP, NICE DCV, and so forth. In various embodiments, the endpoint device 102a may minimize and/or close the remote application window 112 without affecting the operation of the remote application.

The interface layer 114 includes portions of the workstation interface 110 that receive one or more user inputs in association with the remote application 142. In various embodiments, the remote workstation interface application 124a may determine that a user input has occurred and may respond by determining the context of the user input and causing the workstation instance 104 to perform a set of applicable actions associated with the user input. In some embodiments, the interface layer 114 may include a plurality of windows and/or window areas. For example, the interface layer 114 may include portions of the workstation interface 110 that correspond to additional tools and/or capabilities beyond those that can be performed by the remote application 142 via direct input.

In one example, the interface layer 114 could include an overlay 116 over a remote application window 112 that enables complex interactions, such as a drag-and-drop user action to cause the remote application 142 to open an asset file 148 corresponding to an asset 166a displayed in a different window (e.g., a non-overlay 118 such as an asset viewing window). In another example, the interface layer 114 may include one or more overlays that provide contextual menus that include one or more tools in addition to the tools provided by the remote application 142 (e.g., batching operations, aggregation operations, publishing operations, etc.).

The overlays areas 116 (e.g., overlay 116a, 116b, etc.) include one or more areas of the workstation interface 110 that are positioned over specific areas of one or more windows included in the workstation interface 110. For example, the remote workstation interface application 124a could cause a transparent overlay 116 to cover the entirety of the remote application window 112. In some embodiments, the remote workstation interface application 124a may provide separate overlays 116 over each of the remote application windows 112. In some embodiments, the overlay 116 may be transparent and may change color upon the remote workstation interface application 124a determining the context of a user input. For example, when the remote workstation interface application 124a responds to a user input selecting a thumbnail of an asset and moving the thumbnail over the overlay 116, the remote workstation interface application 124a may change the opacity of the overlay 116 in a manner that highlights the remote application window 112.

The non-overlay areas 118 (e.g., non-overlay 118a, 118b, etc.) are portions of the interface layer 114 that enable tools and capabilities in addition to the tools and capabilities provided by the remote application 142. In some embodiments, the non-overlay 118 may be a surrounding area that borders a remote application window 112. In such instances, the non-overlay 118 may provide additional contextual menus and/or notification areas within the border surrounding the remote application window 112. Additionally or alternatively, the non-overlay 118 may be a separate window, such as an asset-viewing window (e.g., a browser window displaying a list of available assets). In such instances, the non-overlay window 118 may communicate with the remote application via the remote workstation interface application 124a to provide contextual elements, such as notifications from different applications and/or contextual elements associated with a given asset. In some embodiments, the non-overlay 118 may be shared by multiple users, such as a collaboration window that displays the current state of remote applications 142 operated by different users and/or updated assets controlled by different users.

In various embodiments, the remote workstation interface application 124a may respond to a change in one window (e.g., a remote application window 112 and/or a non-overlay window 118) by displaying a notification window in a different window. For example, the remote workstation interface application 124a could receive a notification that the remote application 142 has completed a process (e.g., a video encoding application has completed encoding a video). The remote workstation interface application 124a could respond by displaying a notification in the asset viewing window. In another example, the remote workstation interface application 124a could respond to a different user publishing an update to an asset by displaying a notification pop-up in the overlay 116 that is positioned over the remote application window 112.

The security management module 120 enables the secure transfer of assets 166 and/or asset files 148 between devices. In some embodiments, the security management module 120 may respond to verification requests and/or transfer requests by providing security credentials, such as the security key 122 that is associated with the user. Additionally or alternatively, the security management module 120 may provide authorization tokens and/or other security credentials or identity information to requesting devices. For example, the security management module 120 could include the security key 122 in request messages to retrieve assets from object storage 108 and/or the data store 106. In such cases, object storage 108 and/or the data store 106 could verify the security key 122 before transferring the asset 166 and/or the asset file 148. In some embodiments, the security management module 120 may sign one or more messages using the security key 122 in order to send secure messages via the network 101. In some embodiments, the security management module 120 may, upon receipt of a token, distribute the token and/or the security key 122 to one or more other devices (e.g., object storage 108, the data store 106, etc.) in order to encrypt the data being transferred and enable secure transfer of the data.

The remote workstation interface application (RWIA) 124 (e.g., 124a, 124b, etc.) is a context-aware application that coordinates actions between one or more devices to respond to inputs by the user. In various embodiments, the remote workstation interface application 124 may determine a context associated with a user input and may determine a set of one or more applicable actions to perform at the endpoint device 102 and/or the workstation instance 104 in order to respond to the user input. In some embodiments, multiple instances of the remote workstation interface application 124 may communicate in order to respond to a user input. For example, a remote workstation interface application 124a at the endpoint device 102a could determine that an applicable action associated with the user input is for the remote application 142 to load an asset file 148. The remote workstation interface application 124a may then generate an indication message that specifies the applicable actions that the workstation instance 104 is to perform. The remote workstation interface application 124a may then transmit the indication message to the remote workstation interface application 124b at the workstation instance 104, where the remote workstation interface application 124b causes the workstation instance 104 to transfer a copy of the asset 166a from the data store 106 to the workstation instance 104.

The workstation instances 104 (e.g., 104a, 104b, etc.) may be included in a workstation configuration server (not shown) and includes memory, processing, and storage to operate groups of workstation instances 104. In various embodiments, the workstation configuration server may separately operate each of the workstation instances 104 as separate compute instances that execute processes using connected processing and/or memory resources. In various embodiments, a given workstation instance 104 acts as a compute instance that runs one or more remote applications 142. Each workstation instance 104 may be separately configured with specific configuration settings that may include, for example, a specific operating system type, remote display protocol type, package of installed applications, and so forth. Based on the configuration of the workstation instance 104, the workstation instance 104 may run a given remote application 142 and stream a display of the remote application 142 to the endpoint device based on a remote display protocol. In various embodiments, The remote applications 142 (e.g., 142a, 142b, etc.) are applications that execute various processes associated with accessed assets 166 and/or asset files 148. For example, the remote application 142 could be a digital content creation (DCC) application, such as a visual effects application that accesses an asset 166a, or a content item stored in the object storage 108 in order to execute a graphical rendering and enable a user to complete a task in a video production workflow. In various embodiments, the remote application 142 could be one of several types of software products, such as coding environments, encoding environments, graphics design applications, word processing applications, productivity and communication applications, entertainment applications (e.g., content playback applications, games, etc.), and so forth. In various embodiments, the remote application 142 may include various tools and functions that enable a user to perform specific tasks within the remote application 142. For example, the remote application 142 could be an instance of a three-dimensional (3D) design application that is implemented by the endpoint device 102, where the 3D design application provides various graphical design and rendering tools to generate and render 3D design models.

In some embodiments, the remote application 142, may be installed in the workstation instance 104. In such cases, the endpoint device 102 may access the applicable user process via the workstation instance 104. In various embodiments, in order to effectively execute a given remote application 142, the workstation instance 104 may be configured with specific operating characteristics that enable the workstation instance 104 to effectively execute portions of the remote application 142 and present the information to the user. Using the above example, the workstation instance 104 may be configured to access a connected graphical processing unit (GPU) in order to efficiently render 3D design models in the 3D design application executing on the workstation instance 104. Additionally or alternatively, the endpoint device 102 may cause the workstation instance 104 to operate multiple instances of the remote application 142 in order to execute multiple tasks in parallel (e.g., running multiple encoding instances to encode different video clips in parallel).

In various embodiments, the object storage 108 may include, for example, one or more devices, such as one or more web servers, that store data from a plurality of sources. In various embodiments, the object storage 108 may be an online storage service (e.g., Amazon® Simple Storage Service (S3), Google® Cloud Storage, etc.) in which a catalog of thousands or millions of files and/or objects is stored and/or accessed. In some embodiments, the object storage 108 also may provide computing and/or other processing services. In various embodiments, the object storage 108 may permanently store one or more assets associated with an audiovisual program. For example, an audiovisual program may be encoded as different versions, with each version of the audiovisual program being stored as a separate object.

In various embodiments, a user of the endpoint device 102 may be authorized to access a specific set of assets. The set of assets that are accessible to the user may be a subset of assets stored within the object storage 108. For example, a system administrator or service within network infrastructure (e.g., a workflow manager) could grant the user permission to access a subset of the content items stored in the object storage 108. In such instances, a non-overlay 118 (e.g., an asset viewing window) could identify the subset of assets (as identified in a manifest for the user) in order to further configure the workstation instance 104 that includes the subset of content items.

In some embodiments, the set of assets may be associated with each other through hierarchical permissions. For example, a given asset (e.g., an animated chair) may have a set of linked component content items (e.g., wire frame, textures, sound effects, etc.). In such cases, granting the user access to the given asset may also, through the hierarchical permissions, grant access to one or more of the component content items. The manifest for the user may be updated to include the hierarchy of component items to which the user has access.

A data store 106 stores one or more files associated with the distributed workstation system 100. In various embodiments, the data store 106 may be an online storage service (e.g., Amazon® Simple Storage Service (S3), Google® Cloud Storage, etc.) in which a catalog of thousands or millions of files is stored and/or accessed. In some embodiments, the data store 106 may be a data store that stores data and/or metadata as a plurality of files. In various embodiments, any number of data stores 106 (e.g., 106a, 106b, etc.) may be included in the distributed workstation system 100.

In some embodiments, data store 106 may store specific files that one or more devices (e.g., endpoint devices 102, workstation instances 104) may access via the network 101. For example, the data store 106 includes one or more screen captures 162, interface characteristics 164, and/or assets 166 (e.g., 166a, 166b, etc.).

In various embodiments, a manifest associated with the user may specify a subset of files in data store 106 that are accessible to the user. For example, a workflow management service, media orchestrator, or other device in the distributed workstation system 100 could analyze data associated with one or more workflows (e.g., workflow pipelines, individual tasks, authorized users, etc.), and/or information that is associated with content items stored in the data store 106. Based on analysis of such information, the workflow manager could generate and/or update the manifest to list files and folders that are currently accessible to the user.

In another example, a media orchestrator in the distributed workstation system 100 could receive information from one or more media workflows associated with users of the distributed workstation system 100. Such information may be associated with one or more production workflows of various types. Such production workflow types may include, for example, production tasks that are to be performed by one or more users in relation to assets 166 stored within the data store 106. A media workflow may be a production workflow that includes entries associated with various production tasks that are performed by one or more users. For a given production task, the media workflow may include an entry that specifies the content item as necessary for the user operating the endpoint device 102 to perform the production task, as well as information about the user assigned to perform a task (e.g., username, security path for the security key 129, etc.). In such instances, upon authenticating the user via the security key 129, the user may be granted access to the identified files and folders by providing the workstation instance 104 access to the identified assets 166. In some embodiments, the workstation instance 104 may cause the transfer of an asset 166 and may store one or more asset files 148 that correspond to the asset 166 (e.g., multiple content items that constitute a given asset 166).

In various embodiments, when the workstation interface 110 and/or the remote application 142 requests an asset, the request may be associated with modifying the asset. For example, the request could cause the asset to be copied to a local storage for access or updating. In another example, the request could cause a local copy of an updated asset to be uploaded to the data store 106. In various embodiments, the endpoint device 102 and/or the workstation instance 104 may send a request to the data store 106 that is storing the asset 166. The data store 106 may then locate (e.g., using an asset identifier) the specific data and metadata associated with the asset and transfer the respective data or metadata to the workstation instance 104. When the user makes updates to the asset, the workstation instance 104 may send the updated data and/or updated metadata back to the data store 106.

The screen captures 162 correspond to one or more images corresponding to the display of the remote application 142 at a given time. In some embodiments, the remote workstation interface application 124 may periodically perform a screen capture that corresponds to the remote application 142 as displayed through the remote application window 112. In some embodiments, the remote workstation interface application 124*a* may perform an actual capture of the image of the remote application window 112 as displayed by the endpoint device 102. Alternatively, the remote workstation interface application 124*b* may simulate the display of the remote application 142 and may perform a screen capture of the simulated display. In various embodiments, the remote workstation interface application 124*a* may retrieve the screen captures 162 and may display the screen captures in the interface layer 114 (e.g., include the screen captures in the asset viewing window). In such instances, the remote workstation interface application 124*a* may display the screen captures 162 to display the current state of the remote application 142 as the remote application 142 is running.

The interface characteristics 164 include various characteristics associated with the remote application 142, the workstation interface 110, and/or the workstation instance 104. Such characteristics may include the arrangement of windows (e.g., remote application windows 112 and/or non-overlays 118), the display type of the endpoint device, the height/width of the windows, and so forth. In some embodiments, the remote workstation interface application 124*a* and/or the remote workstation interface application 124*b* may load the interface characteristics upon starting the workstation instance 104 or a specific remote application 142.

Figure 2:
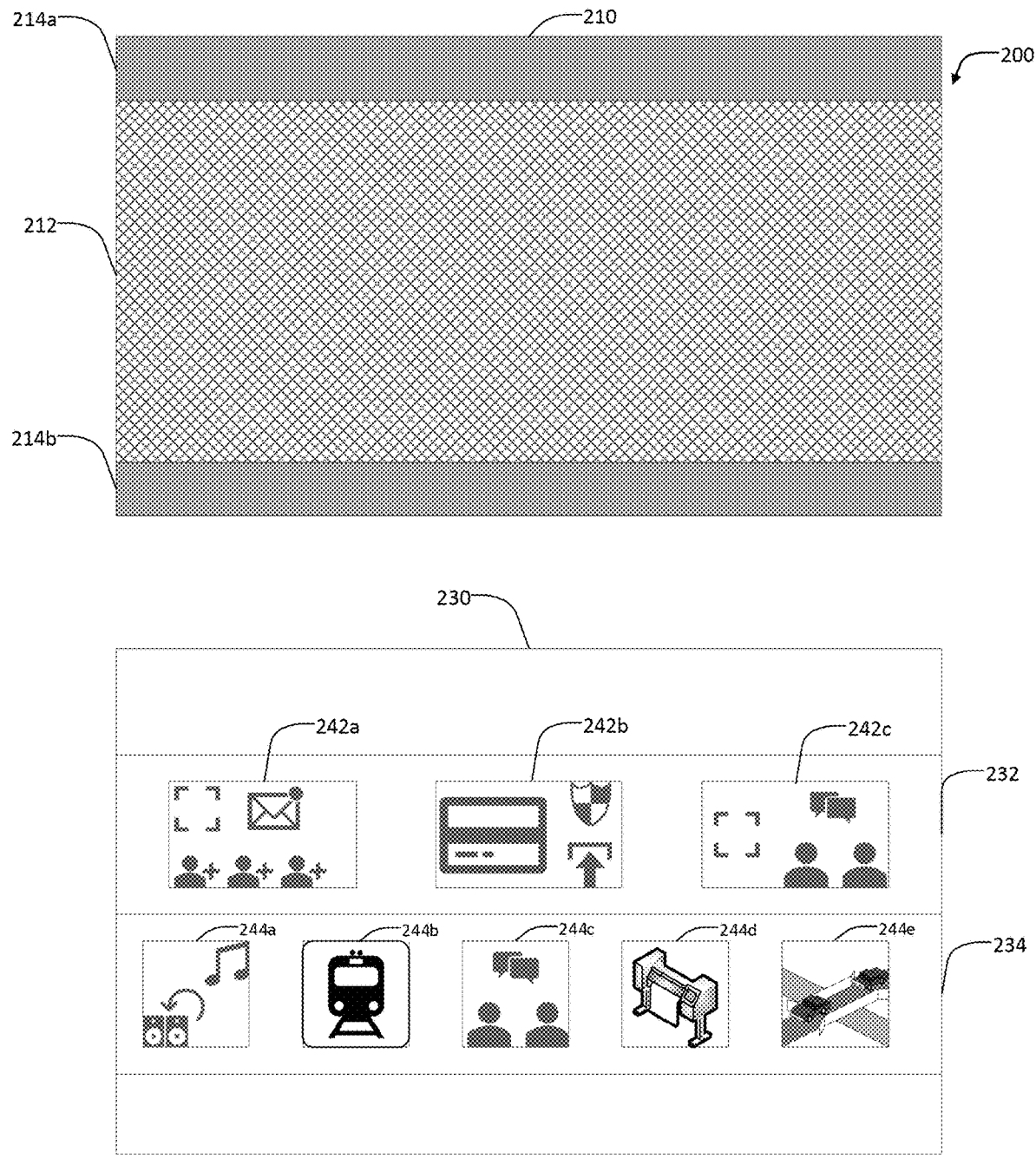
FIG. 2 illustrates an example interface layer provided by the remote workstation interface application of the example distributed workstation system of FIG. 1, according to various embodiments of the present disclosure.

FIG. 2 illustrates an example interface layer provided by the remote workstation interface application of the example distributed workstation system 100 of FIG. 1, according to various embodiments of the present disclosure. As shown, the interface layer 200 includes a remote application window portion 210 and an asset-viewing portion 230.

In various embodiments, the remote workstation interface application 124*a* included in the endpoint device 102 may display the remote application window portion 210 and/or the asset-viewing portion 230 when the user is connecting to other devices in the distributed workstation system 100. In such instances, the remote workstation interface application 124*a* may connect the portions 210 to enable communications between the windows and/or add other functionalities (e.g., contextual menus, additional tools, etc.).

The remote application window portion 210 includes an overlay area 212 and non-overlay areas 214 (e.g., 714*a*, 714*b*). In various embodiments, the overlay area 212 may be a transparent area that covers the remote application window (not shown), while the non-overlay areas 214 provide additional tools and functionalities. For example, the remote workstation interface application 124*a* could cause additional contextual menus and/or additional tools to be displayed in the non-overlay areas in order to provide additional tools associated with the remote application 142.

The asset-viewing portion 230 is a non-overlay 118 that the remote workstation interface application 124*a* displays as a separate window. In various embodiments, the remote workstation interface application 124*a* causes the asset-viewing portion 230 to display thumbnails of various assets and/or remote applications 142 that are viewable to the user. The asset-viewing portion 230 includes a remote application viewing area 232 that includes screen captures 242 (e.g., 242*a*, 242*b*, 242*c*, etc.) of different remote applications 142 running on one or more devices. The asset viewing area 234 includes asset thumbnails 244 (e.g., 244*a*, 244*b*, 244*c*, etc.) of assets published to the data store 106.

In some embodiments, the asset-viewing portion 230 may be a collaboration view shared by multiple users. In such instances, the asset-viewing portion 230 may display one or more screen captures 242 and/or one or more asset thumbnails 244 that are published by other users. In such instances, a group of users may view a state of assets and/or programs for a given group without accessing the asset directly or modifying the asset.

Figure 3:
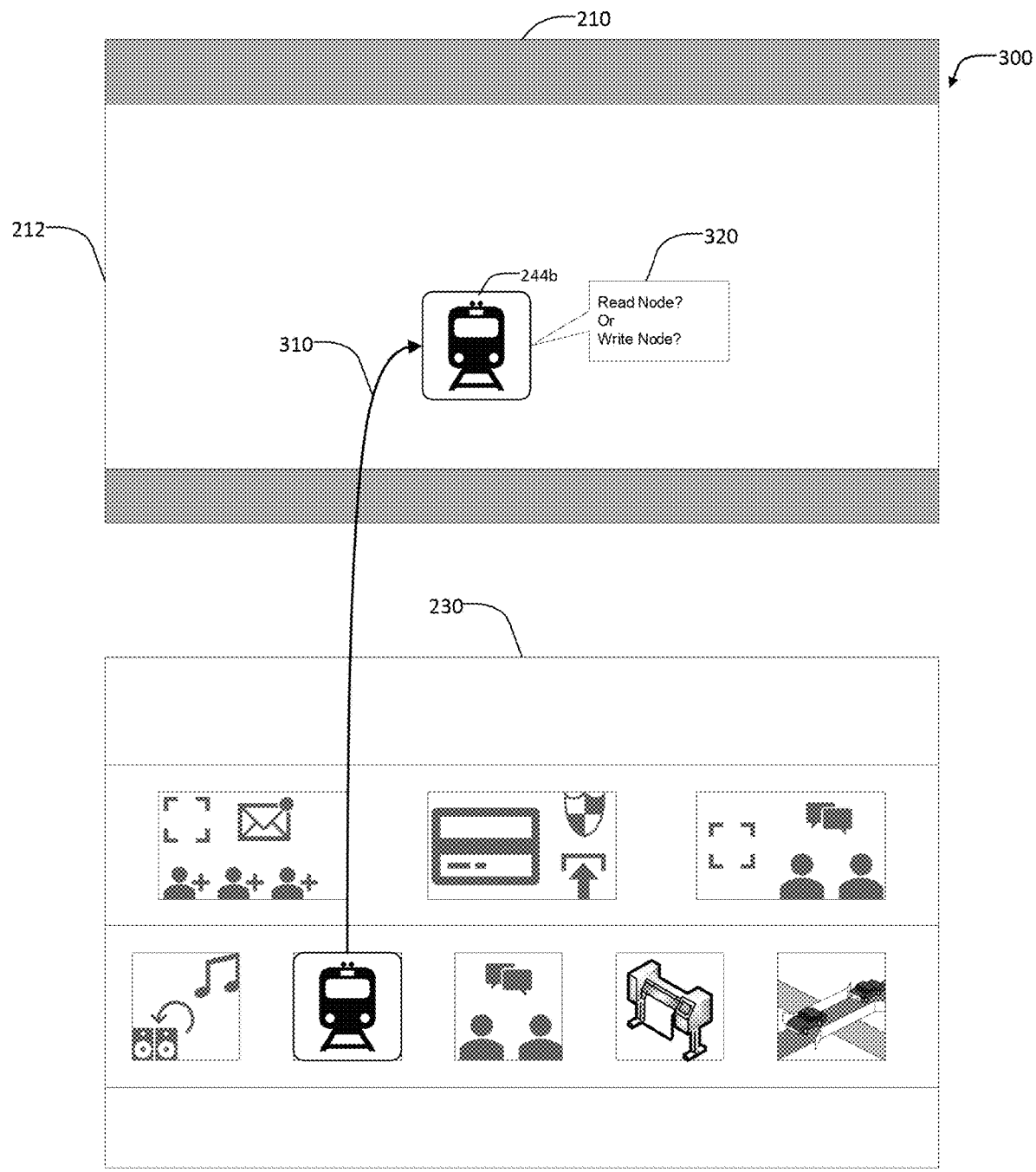
FIG. 3 illustrates a more detailed example of a technique to handle an asset at a workstation instance that is performed by various devices included in the distributed workstation system of FIG. 1, according to various embodiments of the present disclosure.

FIG. 3 illustrates a more detailed example of a technique to handle an asset at a workstation instance 104 that is performed by various devices included in the distributed workstation system 100 of FIG. 1, according to various embodiments of the present disclosure. One or more components of the distributed workstation system 100 may perform various operations 300 related to the remote application 142 to respond to a user input within the interface layer 114 of the endpoint device.

For example, a user could perform a drag-and-drop user input 310 that moves the asset thumbnail 244*b* to the overlay area of the remote application window portion 210. The remote workstation interface application 124*a* may detect at least a portion of the user input (e.g., selecting the asset thumbnail 244*b*, moving the asset thumbnail 244*b* over the overlay area 212, etc.) and may determine the context by determining one or more contextual elements associated with the input. In some embodiments, the remote workstation interface application 124*a* may determine the asset identifier corresponding to the asset thumbnail 244*b* (e.g., the asset 166*b*).

In some embodiments, the remote workstation interface application 124*a* may determine additional contextual elements. For example, upon determining that the user dragged the asset thumbnail 244*b* over the overlay area 212, the remote workstation interface application 124*a* may cause the workstation instance 104 to respond by downloading an asset file 148 that corresponds to the identified asset 166*b*. In some embodiments, the remote workstation interface application 124*a* may additionally determine that the asset can be stored as a read file or a write file. In such instances, the remote workstation interface application 124*a* may generate a contextual menu 320 that prompts the user to select whether the asset 166*b* is to be stored as a read-only file or a writeable file.

In some embodiments, the remote workstation interface application 124*a* may cause one or more contextual windows to be displayed on other portions of the interface layer 114. For example, when the remote application 142 has completed a task, the workstation instance 104 may send a notification message to the endpoint device 102, and the remote workstation interface application 124*a* may respond by displaying a notification window over the asset-viewing portion 230. Similarly, when a new asset has been added to the asset-viewing portion 230, the remote workstation interface application 124a may generate a notification window (not shown) over the overlay area 212.

Figure 4:
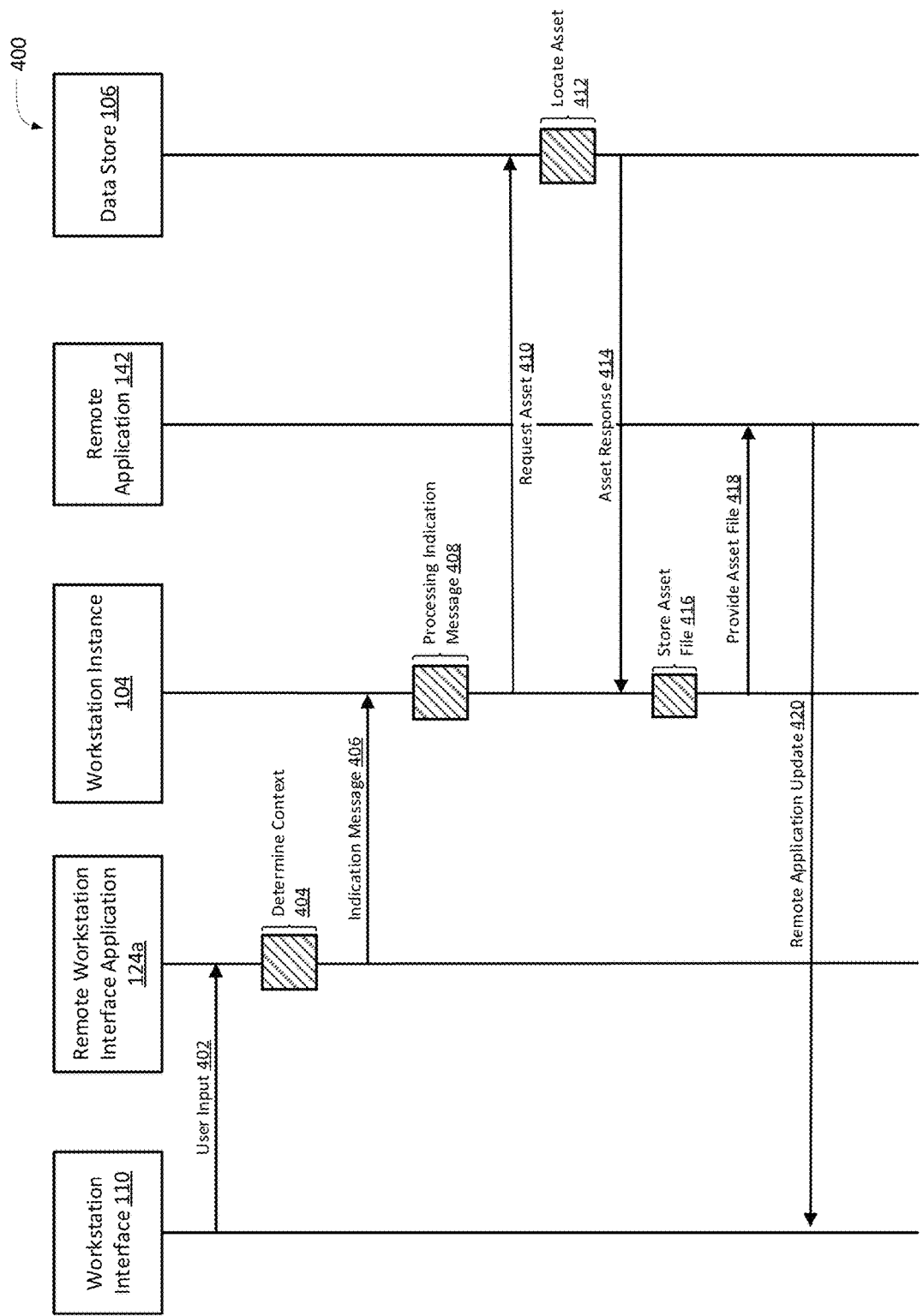
FIG. 4 illustrates an interaction diagram showing interactions between various components of the example distributed workstation system of FIG. 1, according to various embodiments of the present disclosure.

FIG. 4 illustrates an interaction diagram showing interactions between various components of the example distributed workstation system 100 of FIG. 1, according to various embodiments of the present disclosure. One or more components of the distributed workstation system 100 may perform various operations to respond to a user input associated with a remote application 142 running on a workstation instance 104 by performing a set of applicable actions based on the context of the user input.

The example interaction diagram shows an example set of interactions associated with the user performing a drag-and-drop user input 310 in order for a remote application 142 to open an asset 166 that is remotely stored in data store 106. Other interactions between the one or more components of the distributed workstation system 100 are also within the scope of this disclosure.

When responding to a specific user input, the workstation interface 110 provides the user input 402 to the remote workstation interface application 124a. In various embodiments, the remote workstation interface application 124a at the endpoint device 102 may determine that the user has made the user input 402 and that the user input 402 is associated with an action to be performed with the remote application 142. For example, the user input 402 could be the selection of an asset thumbnail 244 in the asset-viewing window separate from the remote application window 112.

The remote workstation interface application 124a performs various actions 404 determines a context that is associated with the user input 402. In various embodiments, upon determining that the user has made the user input 402 workstation interface 110 (e.g., over a portion of the interface layer 114), the remote workstation interface application 124a determines the context of the input in order to determine the applicable action that is to occur. For example, the user may provide the user input 402 by selecting an asset thumbnail 244 (e.g., the asset thumbnail 244b) of the asset 166 from the asset-viewing portion 230. In such instances, the selection of the asset thumbnail 244b could be an initial input made by the user to initiate the user input 402. In response, the remote workstation interface application 124a may respond by determining the context. In various embodiments, the context may include various contextual elements about the asset or application (e.g., an asset ID for a selected asset) and one or more contextual actions (e.g., adding an asset as a read node or write node, responding to a notification pop-up, etc.). In some embodiments, the remote workstation interface application 124a may determine two or more possible contextual elements (e.g., multiple actions to perform, multiple files included in a group of files, etc.) associated with the user input. In such instances, the remote workstation interface application 124a may prompt the user to select the applicable contextual element. Alternatively, the remote workstation interface application 124a may determine a default contextual element associated with the user input.

The remote workstation interface application 124a generates an indication message 406 associated with the user input 402. In various embodiments, in response to determining the context associated with the user input 402, the remote workstation interface application 124a may generate an indication message 406 that corresponds to the user input 402. In some embodiments, the indication message 406 may include one or more contextual elements, such as an indication of the action to be performed, an asset ID corresponding to the asset selected by the user, and so forth. In some embodiments, the indication message 406 may also include an identifier corresponding to the applicable remote application 142 that is to perform actions, such as accessing the identified asset 166. The application identifier may be added, for example, when the user has multiple remote application windows 112 that are active.

The workstation instance 104, upon receiving the indication message 406 from the remote workstation interface application 124a, performs various actions 408 to process the indication message 406. In various embodiments, a remote workstation interface application 124b included in the workstation instance 104 may receive the indication message 406 provided by the remote workstation interface application 124a and may process the indication message 406 to determine a set of actions that various devices (e.g., the workstation instance 104, the data store 106, etc.) are to take. Such actions are taken in order to respond to the user input 402 indicated by the indication message 406. In such instances, the remote workstation interface application 124b may process the contextual elements included in the indication message 406 in order to determine the set of applicable actions. For example, the contextual elements could include actions to modify an asset, such as by generating a local copy of an asset and/or updating an asset based on an updated local copy. In such instances, the remote workstation interface application 124b could determine the actions that the workstation instance 104 and/or the data store 106 are to take in order to modify the asset.

The workstation instance 104 sends a request message 410 for the asset identified in the indication message 406. In some embodiments, the remote workstation interface application 124b responds to processing the indication message 406 by identifying an asset that is to be stored locally. When the remote workstation interface application 124b determines that no asset file 148 corresponding to the asset exists, the remote workstation interface application 124b transmits a request message 410 to the data store 106 in order to initiate a transfer of the asset to the workstation instance. A control server (not shown) or other device performs various actions 412 in order to locate the asset stored in the data store 106. The control server may then transmit a response message 414 that includes the identified asset.

The workstation instance 104 responds to receiving the asset by performing various actions 416 to store the asset file 148 corresponding to the identified asset. In various embodiments, the remote workstation interface application 124b may cause the workstation instance 104 to convert the received asset into one or more asset files. For example, a given asset 166 may include a set of different files (e.g., multiple data files and/or metadata files). The workstation instance 104 may store the different files as asset files 148 in the file system 146 of the workstation instance 104.

The workstation instance performs actions 418 to provide the asset files 148 to the remote application 142. In various embodiments, the remote workstation interface application 124b may cause the remote application 142 to access the asset files 148 from the local file system 146. In some embodiments, the asset files 148 may be stored as read-only files or writable files. Based on how the asset files 148 are stored, the remote application 142 may read from and/or write to the asset files 148.

The remote application 142 may provide a remote application update 420 for the remote application window 112 included in the workstation interface 110. In various embodiments, the remote workstation interface application 124*b* at the workstation instance 104 may cause the remote application 142 operating at the workstation instance 104 to provide an update 420 to the remote application window 112 based on the set of applicable actions that the remote workstation interface application 124*b* caused to be performed. For example, upon the remote workstation interface application 124*b* causing the remote application 142 to access the asset file 148, the remote workstation interface application 124*b* could cause the remote application window 112 to update to reflect that the remote application 142 has opened the asset file 148. Additionally or alternatively, one of the remote workstation interface applications 124 may perform a screen capture 162 of the remote application 142 and/or the remote application window 112 in order to reflect the updated state of the remote application 142. In such instances, the asset-viewing portion 230 may display the screen capture 162 as a screen capture 242 corresponding to the state of the remote application 142.

Figure 5:
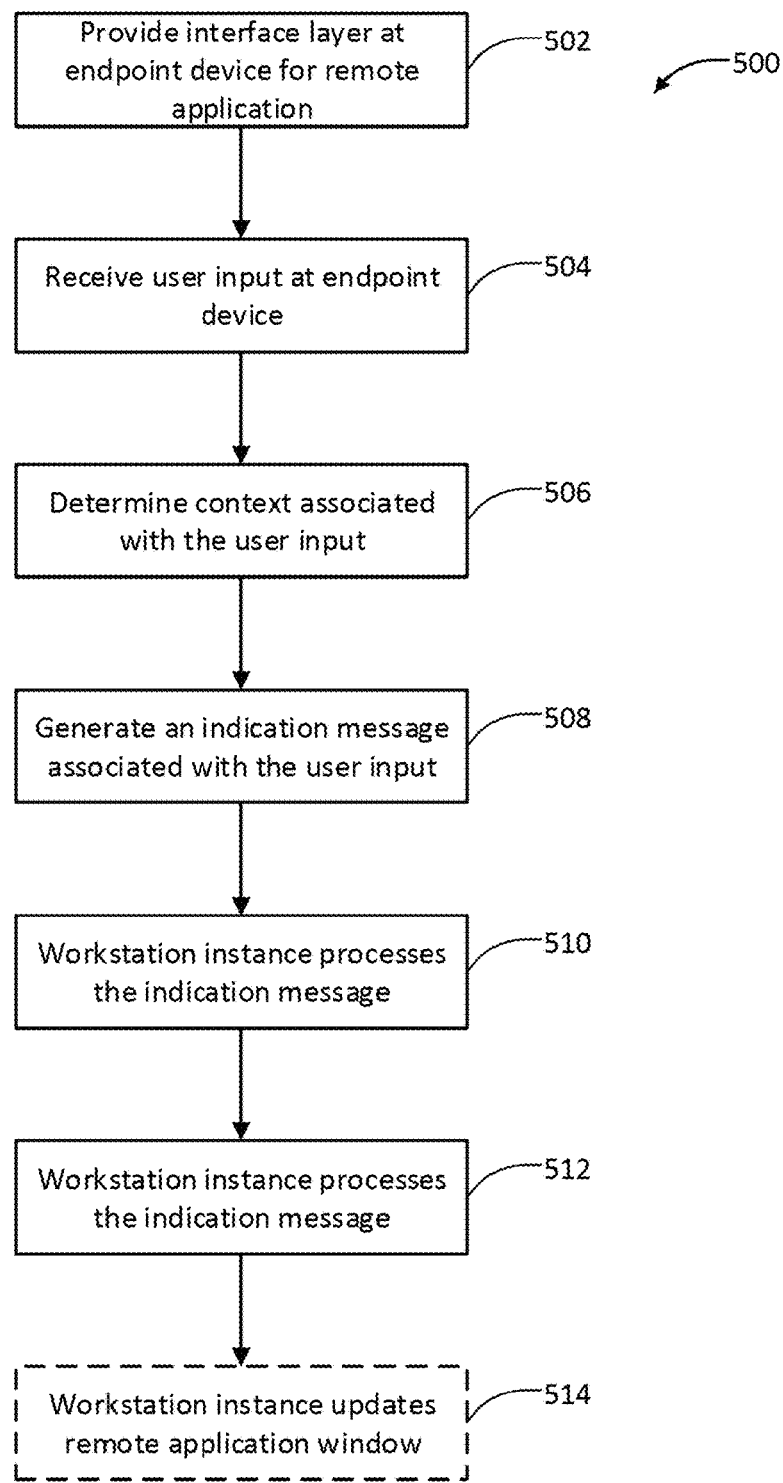
FIG. 5 sets forth a flow diagram of method steps for handling an asset in association with a workstation instance performed by various devices included in the distributed video production system of FIG. 1, according to various embodiments of the present disclosure.

FIG. 5 sets forth a flow diagram of method steps for handling an asset in association with a workstation instance performed by various devices included in the distributed workstation system 100 of FIG. 1, according to various embodiments of the present disclosure. Although the method steps are described with reference to the systems and call flows of FIGS. 1-4, persons skilled in the art will understand that any system configured to implement the method steps, in any order, falls within the scope of the present disclosure.

Method 500 begins at step 502, where a remote workstation interface application 124 provides an interface layer at an endpoint device for a remote application. In various embodiments, a remote workstation interface application 124*a* operating at an endpoint device 102 may cause the endpoint device 102 to display a workstation interface 110 that includes one or more remote application windows 112 that show operations of a remote application 142 running in a workstation instance 104. The remote workstation interface application 124 provides an interface layer 114 for the workstation interface 110 that includes overlays 116 over portions of the remote application windows 112, and/or one or more non-overlays 118 over other areas of the workstation interface 110. The interface layer 114 enables the remote workstation interface application 124 to provide tools associated with the remote application 142 and extends the capabilities of the remote application 142.

At step 504, the remote workstation interface application 124 receives a user input at the endpoint device. In various embodiments, the remote workstation interface application 124*a* at the endpoint device 102 may determine that the user has made an input associated with an action to be performed with the remote application 142. In various embodiments, the remote workstation interface application 124*a* at the endpoint device 102 may detect an input at a portion of the interface layer 114. For example, the user could select an asset listed in a non-overlay 118 (e.g., an asset-viewing window separate from the remote application window 112).

At step 506, the remote workstation interface application 124 determines a context that is associated with the user input. In various embodiments, upon determining that the user has made an input at a portion of the interface layer 114, the remote workstation interface application 124*a* determines the context of the input in order to determine the applicable action that is to occur. For example, the user could select the asset thumbnail of the image from the asset-viewing window. In such instances, the selection of the thumbnail could be an initial input made by the user to initiate a drag-and-drop operation, moving the selected thumbnail to an overlay 116 over the remote application window 112.

In response to the initial user input, the remote workstation interface application 124*a* may respond to the user input by determining the context. In various embodiments, the context may include information about the asset or application (e.g., an asset ID for a selected asset) and one or more contextual actions (e.g., adding an asset as a read node or write node, responding to a notification pop-up, etc.). In some embodiments, the remote workstation interface application 124*a* may determine two or more possible contextual elements (e.g., specific action to perform, specific file from a group of files, etc.) associated with the user input. In such instances, the remote workstation interface application 124*a* may prompt the user to select the applicable contextual element. Alternatively, the remote workstation interface application 124*a* may determine a default contextual element associated with the user input.

At step 508, the remote workstation interface application 124 generates an indication message associated with the user input. In various embodiments, in response to determining the context associated with the user input, the remote workstation interface application 124*a* may generate an indication message that corresponds to the user input. In some embodiments, the indication message may include one or more contextual elements, such as an indication of the action to be performed and an asset ID corresponding to the asset selected by the user. In some embodiments, the indication message may also include an identifier corresponding to the applicable remote application 142 (such as when the user has multiple remote application windows 112 that are active).

At step 510, the workstation instance 104 processes the indication message. In various embodiments, a remote workstation interface application 124*b* at the workstation instance 104 may receive the indication message provided by the remote workstation interface application 124*a* and may determine the set of applicable actions to take to perform the action specified by the indication message. In such instances, the remote workstation interface application 124*b* may process the contextual elements included in the indication message in order to determine the set of applicable actions.

At step 512, the workstation instance 104 performs an action based on the indication message. In various embodiments, the remote workstation interface application 124*b* coordinates with various components to cause the workstation instance 104 to complete the determined set of applicable actions. For example, the remote workstation interface application 124*b* could determine that the set of applicable actions include actions associated with modifying an asset, such as ensuring that an asset file 148 (identified via the asset ID in the indication message) is stored in the file system 146 of the workstation instance 104. The remote workstation interface application 124*b* cause the remote application 142 to open the asset file 148 from the file system 146. In some embodiments, the remote workstation interface application 124*b* may first determine that an asset file 148 is not stored in the file system 146 and may respond by causing the workstation instance 104 to receive a transfer of the corresponding asset 166*a* from the data store 106.

At step 514, the workstation instance 104 may optionally update the remote application window 112. In various embodiments, the remote workstation interface application 124*b* at the workstation instance 104 may cause the remote application 142 operating at the workstation instance 104 to update the remote application window 112 based on the set of applicable actions that the remote workstation interface application 124b caused to be performed. For example, upon the remote workstation interface application 124b causing the remote application 142 to access the asset file 148, the remote workstation interface application 124b could cause the remote application window 112 to update to reflect that the remote application 142 has opened the accessed asset file 148. Additionally or alternatively, one of the remote workstation interface applications 124 may perform a screen capture of the remote application 142 and/or the remote application window 112 in order to reflect the updated state of the remote application 142. In such instances, the non-overlay 118 (e.g., the asset viewing window) may display the screen capture as a thumbnail image corresponding to the state of the remote application 142.

Content Delivery System Overview

Figure 6:
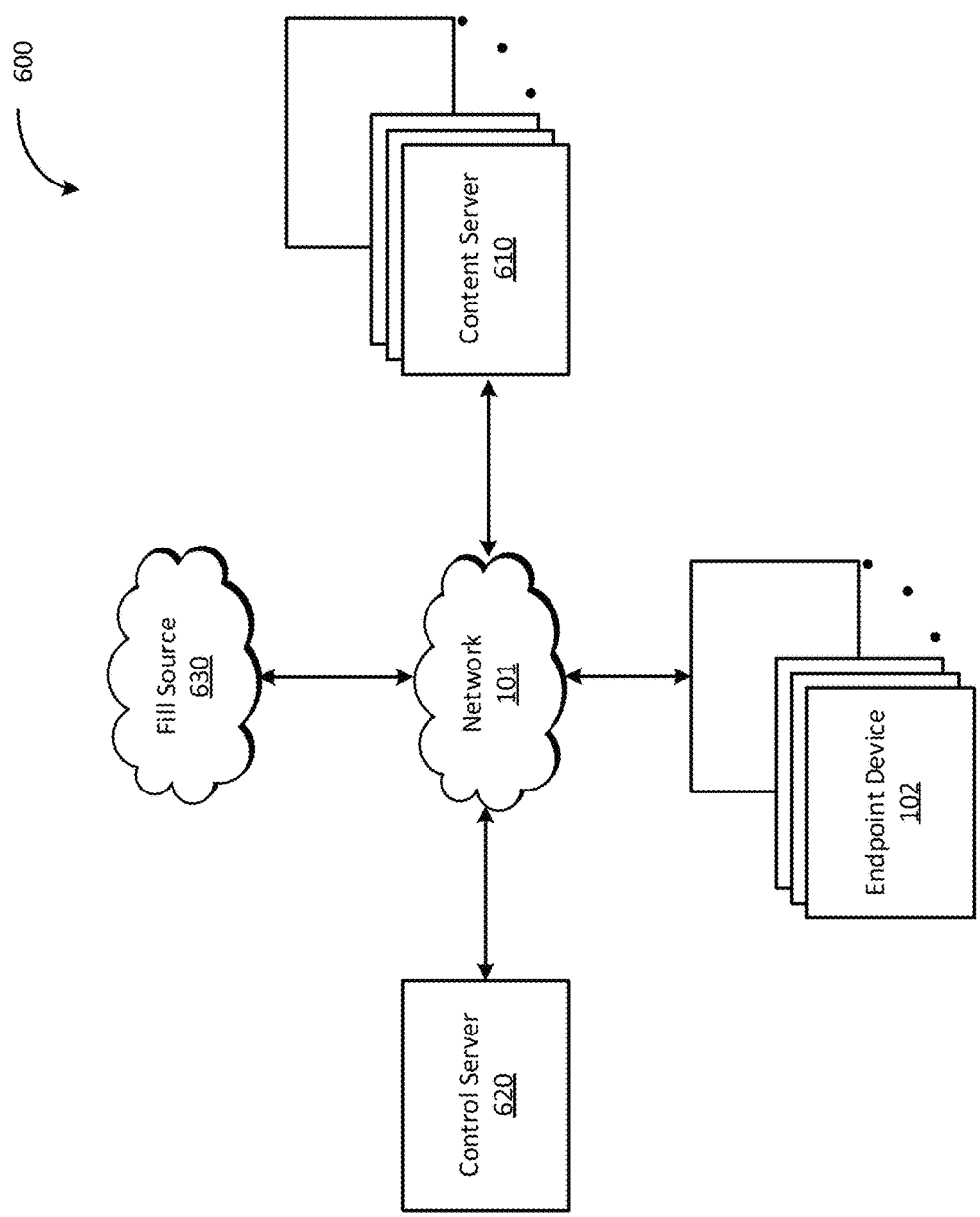
FIG. 6 illustrates another example network infrastructure that is configured to implement one or more aspects of the present disclosure.

FIG. 6 illustrates another example network infrastructure that is configured to implement one or more aspects of the present disclosure. As shown, the network infrastructure 600 includes one or more content servers 610, a control server 620, and one or more endpoint devices 102, which are connected to one another and/or one or more cloud services 630 via the communications network 101. The network infrastructure 600 is generally used to distribute content to the content servers 610 and the endpoint devices 102.

Each endpoint device 102 communicates with one or more content servers 610 (also referred to as "caches" or "nodes") via the network 101 to download content, such as textual data, graphical data, audio data, video data, and other types of data. The downloadable content, also referred to herein as a "file," is then presented to a user of one or more endpoint devices 102. In various embodiments, the endpoint devices 102 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Network 101 includes any technically feasible wired, optical, wireless, or hybrid network that transmits data between or among the content servers 610, the control server 620, the endpoint device 102, the cloud services 630, and/or other components. For example, the network 101 could include a wide area network (WAN), local area network (LAN), personal area network (PAN), WiFi network, cellular network, Ethernet network, Bluetooth network, universal serial bus (USB) network, satellite network, and/or the Internet.

Each content server 610 may include one or more applications configured to communicate with the control server 620 to determine the location and availability of various files that are tracked and managed by the control server 620. Each content server 610 may further communicate with the cloud services 630 and one or more other content servers 610 to "fill" each content server 610 with copies of various files. In addition, the content servers 610 may respond to requests for files received from endpoint devices 102. The files may then be distributed from the content server 610 or via a broader content distribution network. In some embodiments, the content servers 610 may require users to authenticate (e.g., using a username and password) before accessing files stored on the content servers 610. Although only a single control server 620 is shown in FIG. 6, in various embodiments multiple control servers 620 may be implemented to track and manage files.

In various embodiments, the cloud services 630 may include an online storage service (e.g., Amazon® Simple Storage Service, Google® Cloud Storage, etc.) in which a catalog of files, including thousands or millions of files, is stored and accessed in order to fill the content servers 610. The cloud services 630 also may provide compute or other processing services. Although only a single instance of cloud services 630 is shown in FIG. 6, in various embodiments multiple cloud services 630 and/or cloud service instances may be implemented.

Figure 7:
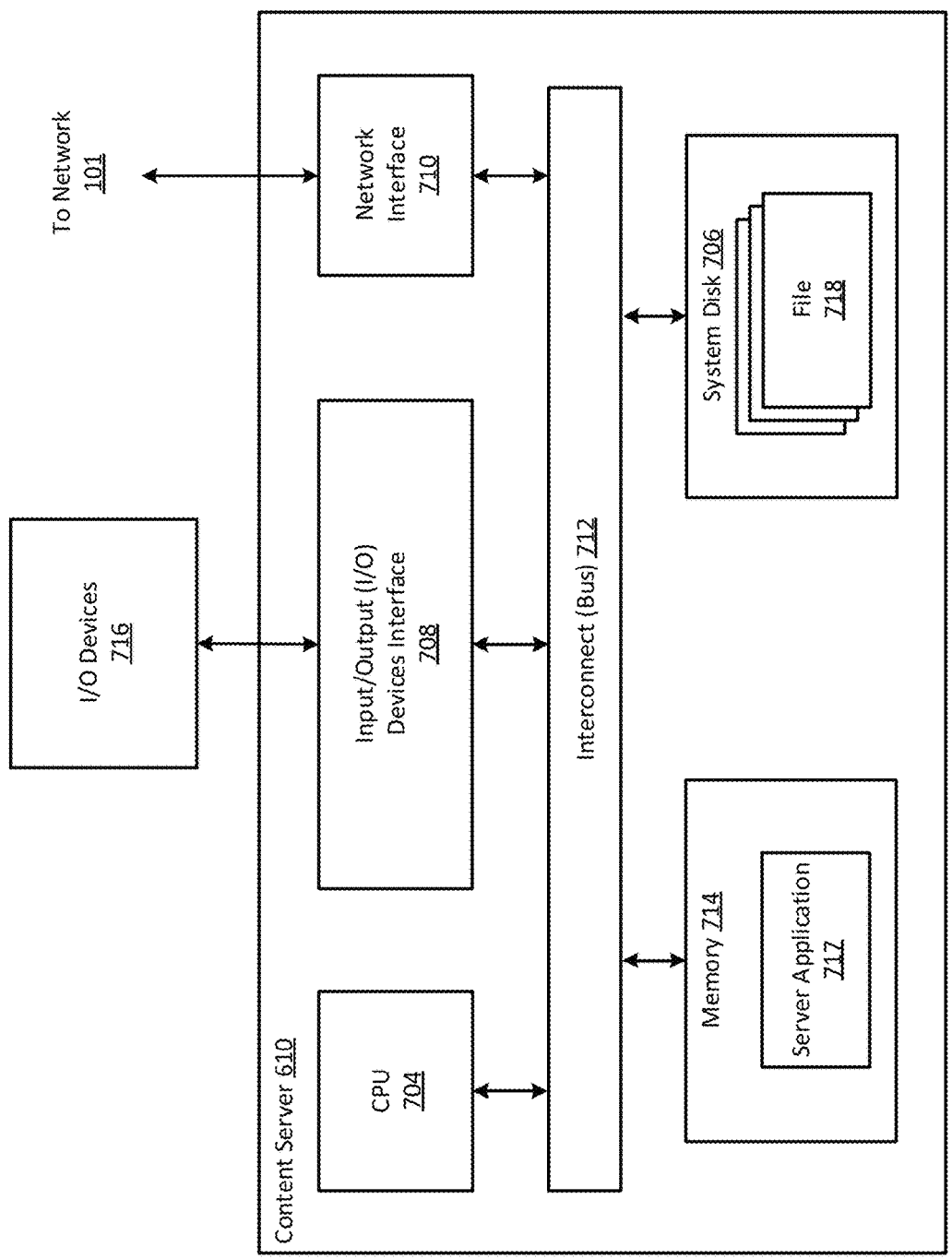
FIG. 7 is a more detailed illustration of the content server of FIG. 7, according to various embodiments of the present disclosure.

FIG. 7 is a more detailed illustration of the content server 610 of FIG. 6, according to various embodiments of the present disclosure. As shown, the content server 610 includes, without limitation, a central processing unit (CPU) 704, a system disk 706, an input/output (I/O) devices interface 708, a network interface 710, an interconnect 712, and a system memory 714.

The CPU 704 is configured to retrieve and execute programming instructions, such as a server application 717, stored in the system memory 714. Similarly, the CPU 704 is configured to store application data (e.g., software libraries) and retrieve application data from the system memory 714. The interconnect 712 is configured to facilitate transmission of data, such as programming instructions and application data, between the CPU 704, the system disk 706, the I/O devices interface 708, the network interface 710, and the system memory 714. The I/O devices interface 708 is configured to receive input data from the I/O devices 216 and transmit the input data to the CPU 704 via the interconnect 712. For example, the I/O devices 216 may include one or more buttons, a keyboard, a mouse, and/or other input devices. The I/O devices interface 708 is further configured to receive output data from the CPU 704 via the interconnect 712 and transmit the output data to the I/O devices 216.

The system disk 706 may include one or more hard disk drives, solid state storage devices, or similar storage devices. The system disk 706 is configured to store non-volatile data such as files 718 (e.g., audio files, video files, subtitle files, application files, software libraries, etc.). The files 718 can then be retrieved by the one or more endpoint devices 102 via the network 101. In some embodiments, the network interface 710 is configured to operate in compliance with the Ethernet standard.

The system memory 714 includes the server application 717, which is configured to service requests received from the endpoint device 102 and other content servers 610 for the one or more files 718. When the server application 717 receives a request for a given file 718, the server application 717 retrieves the requested file 718 from the system disk 706 and transmits the file 718 to an endpoint device 102 or a content server 610 via the network 101. The files 718 include digital content items such as video files, audio files, and/or still images. In addition, the files 718 may include metadata associated with such content items, user/subscriber data, etc. The files 718 that include visual content item metadata and/or user/subscriber data may be employed to facilitate the overall functionality of network infrastructure 600. In alternative embodiments, some, or all of the files 718 may instead be stored in a control server 620, or in any other technically feasible location within the network infrastructure 600.

Figure 8:
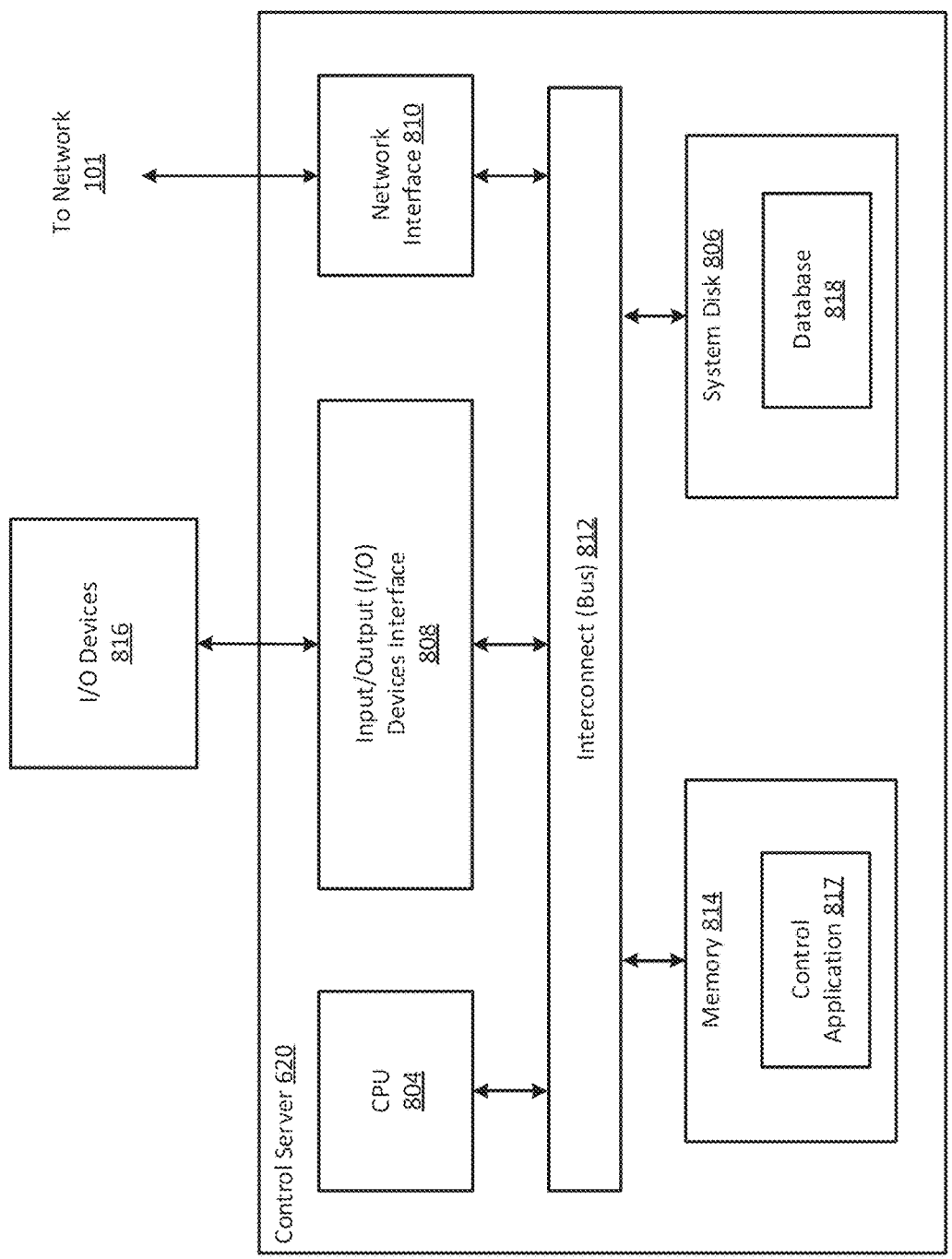
FIG. 8 is a more detailed illustration of the control server of FIG. 7, according to various embodiments of the present disclosure.

FIG. 8 is a more detailed illustration of the control server 620 of FIG. 7, according to various embodiments of the present disclosure. As shown, the control server 620 includes, without limitation, a central processing unit (CPU) 804, a system disk 806, an input/output (I/O) devices interface 808, a network interface 810, an interconnect 812, and a system memory 814.

The CPU 804 is configured to retrieve and execute programming instructions, such as the control application 817, stored in the system memory 814. Similarly, the CPU 804 is configured to store application data (e.g., software libraries) and retrieve application data from the system memory 814 and a database 318 stored in the system disk 806. Interconnect 812 is configured to facilitate transmission of data between the CPU 804, the system disk 806, the I/O devices interface 808, the network interface 810, and the system memory 814. The I/O devices interface 808 is configured to transmit input data and output data between the I/O devices 316 and the CPU 804 via interconnect 812. The system disk 806 may include one or more hard disk drives, solid state storage devices, and the like. The system disk 806 is configured to store a database 318 of information associated with content servers 610, cloud services 630, and files 718.

The system memory 814 includes a control application 817 configured to access information stored in the database 818 and process the information to determine the manner in which specific files 718 will be replicated across the content servers 610 included in the network infrastructure 600. The control application 817 may further be configured to receive and analyze performance characteristics associated with one or more of the content servers 610 and/or the endpoint devices 102. As noted above, in some embodiments, metadata associated with such visual content items, and/or user/subscriber data may be stored in database 818 rather than in files 718 stored in content servers 610.

Figure 9:
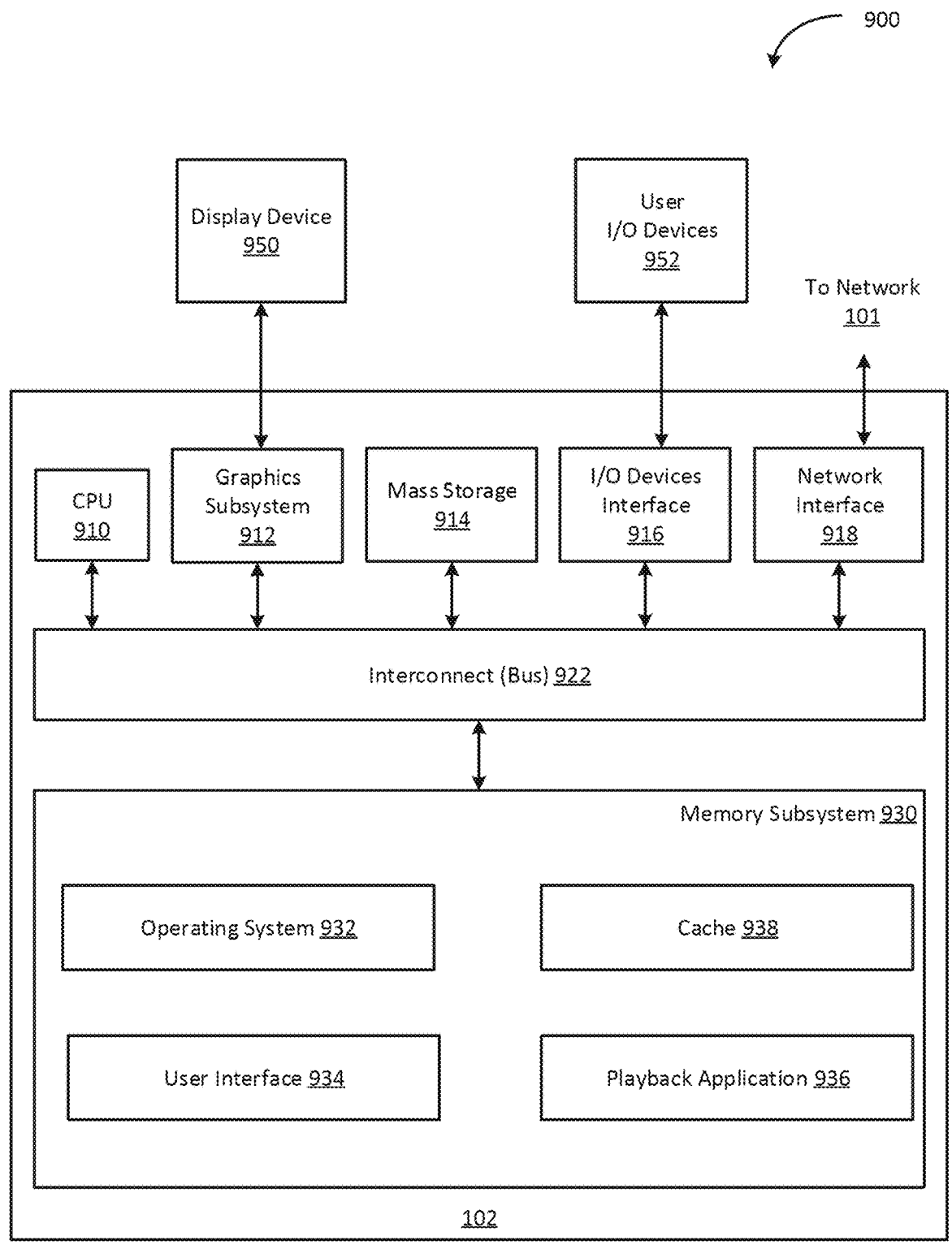
FIG. 9 is a more detailed illustration of the endpoint device of FIG. 7, according to various embodiments of the present disclosure.

FIG. 9 is a more detailed illustration of the endpoint device 102 of FIG. 7, according to various embodiments of the present disclosure. As shown, the endpoint device 102 may include, without limitation, a CPU 910, a graphics subsystem 912, an I/O devices interface 914, a mass storage unit 916, a network interface 918, an interconnect 922, and a memory subsystem 930.

In some embodiments, the CPU 910 is configured to retrieve and execute programming instructions stored in the memory subsystem 930. Similarly, the CPU 910 is configured to store and retrieve application data (e.g., software libraries) residing in the memory subsystem 930. The Interconnect 922 is configured to facilitate transmission of data, such as programming instructions and application data, between the CPU 910, the graphics subsystem 912, the I/O devices interface 914, the mass storage unit 916, the network interface 918, and the memory subsystem 930.

In some embodiments, the graphics subsystem 912 is configured to generate frames of video data and transmit the frames of video data to the display device 950. In some embodiments, the graphics subsystem 912 may be integrated into an integrated circuit, along with CPU 910. The display device 950 may comprise any technically feasible means for generating an image for display. For example, the display device 950 may be fabricated using liquid crystal display (LCD) technology, cathode-ray technology, and light-emitting diode (LED) display technology. The I/O devices interface 914 is configured to receive input data from the user I/O devices 952 and transmit the input data to the CPU 910 via the interconnect 922. For example, the user I/O devices 952 may include one or more buttons, a keyboard, and/or a mouse or other pointing device. The I/O devices interface 914 also includes an audio output unit configured to generate an electrical audio output signal. The user I/O devices 952 includes a speaker configured to generate an acoustic output in response to the electrical audio output signal. In alternative embodiments, the display device 950 may include the speaker. Examples of suitable devices known in the art that can display video frames and generate an acoustic output include televisions, smartphones, smartwatches, electronic tablets, and the like.

A mass storage unit 916, such as a hard disk drive or flash memory storage drive, is configured to store non-volatile data. The network interface 918 is configured to transmit and receive packets of data via the network 101. In some embodiments, the network interface 918 is configured to communicate using the well-known Ethernet standard. The network interface 918 is coupled to the CPU 910 via the interconnect 922.

In some embodiments, the memory subsystem 930 includes programming instructions and application data that include an operating system 932, a user interface 934, a playback application 936, and a platform player 938. The operating system 932 performs system management functions such as managing hardware devices including the network interface 918, the mass storage unit 916, the I/O devices interface 914, and the graphics subsystem 912. The operating system 932 also provides process and memory management models for the user interface 934, the playback application 936, and/or the platform player 938. The user interface 934, such as a window and object metaphor, provides a mechanism for user interaction with the endpoint device 102. Persons skilled in the art will recognize the various operating systems and user interfaces that are well-known in the art and suitable for incorporation into the endpoint device 102.

In some embodiments, playback application 936 is configured to request and receive content from content server 610 via network interface 918. Further, playback application 936 is configured to interpret the content and present the content via display device 950 and/or user I/O devices 952. In so doing, playback application 936 may generate frames of video data based on the received content and then transmit those frames of video data to platform player 938. In response, platform player 938 causes display device 950 to output the frames of video data for playback of the content on endpoint device 102. In one embodiment, platform player 938 is included in operating system 932.

In sum, a remote workstation interface application operating at an endpoint device causes the endpoint device to display an interface layer in conjunction with windows that show a remote application running in a workstation instance. The remote interface application provides an interface layer that includes overlay areas that cover the application windows, and/or one or more non-overlay areas that include areas surrounding the application windows and other windows that endpoint device displays. The interface layer provides tools associated with the remote application and extends the capabilities of the remote application. Upon determining that the user has made an input at a portion of the interface layer, the remote workstation interface application determines the context of the input to determine the applicable action that is to occur at the workstation instance. For example, when selecting an asset to open in a remote application, the user provides an input by dragging a thumbnail of the image to the overlay area of the remote application window. The remote workstation interface application detects the user input and determines the context for the action, such as by acquiring the asset identifier for the asset selected by the user, identifying the applicable remote application, and determining the most relevant actions for the asset. The remote workstation interface application generates and transmits an indication message to the workstation instance that includes the determined context.

A corresponding remote workstation interface application operating at the workstation instance receives the indication message and responds by communicating with at least the remote application to execute the action. For example, upon receiving an indication message to open the asset in the remote application, the remote workstation interface application identifies the asset and determines whether a file corresponding to the asset is stored in the file system of the workstation instance. When the remote workstation interface application determines that the corresponding file is not stored in the file system, the remote workstation interface application communicates with a data store that is storing the asset to transfer a copy of the asset to the workstation instance. The remote workstation interface application causes a file corresponding to the asset to be stored. The remote workstation interface application then causes the remote application to open the file from the file system of the workstation instance. In various embodiments, the respective remote workstation interface applications may execute other actions, such as generating screen captures of the remote application, publishing versions of the asset upon updates by the remote application, and so forth. In various embodiments, the remote workstation interface application operating at the endpoint device and a remote workstation interface application that is operating at the workstation instance coordinate to provide additional capabilities to the remote application that are similar to the capabilities of the application when the application runs natively on the endpoint device.

At least one technological advantage of the disclosed techniques relative to the prior art is that the remote workstation interface application extends the capabilities of an application operating on a workstation instance that is remote to the user, improving the functionality of the application when operating on the workstation instance. In addition, by providing a uniform set of tools and capabilities over a suite of different applications, the remote workstation interface application enables a user to become familiar with the set of tools that are available for use. This improved usability results in a more-effective use of the remote applications when operated by the user. Further, the remote workstation interface application enables a user to operate multiple instances of the remote application on one or more workstation instances. Since the workstation instances have more computing resources than the endpoint device of the user, running remote applications on virtual workstations in this manner thus improves the use of the available computing resources in the distributed computing environment. These technical advantages provide one or more technological advancements over prior art approaches.

1. In various embodiments, a computer-implemented method comprises receiving, at an endpoint device, a user input associated with a first remote application running on a workstation instance associated with the user, determining, based on a context associated with the user input, a first asset associated with the user input, and causing the workstation instance to modify an asset file in a local file system of the workstation instance, where the asset file corresponds to at least a portion of the first asset.

2. The computer-implemented method of clause 1, where the context includes an asset identifier for the first asset.

3. The computer-implemented method of clause 1 or 2, where modifying the asset file comprises receiving the first asset from a remote data store that is separate from the endpoint device and the workstation instance, converting the asset to the asset file, and storing the asset file in the local file system of the workstation instance.

4. The computer-implemented method of any of clauses 1-3, further comprising causing the workstation instance to update the asset file, and causing the remote data store to receive the updated asset file, where the data store modifies the first asset responsive to the updated asset file.

5. The computer-implemented method of any of clauses 1-4, where the user input comprises at least a portion of a drag-and-drop input that selects a thumbnail corresponding to the first asset.

6. The computer-implemented method of any of clauses 1-5, further comprising displaying, by the endpoint device in an asset-viewing window, a thumbnail corresponding to the first asset.

7. The computer-implemented method of any of clauses 1-6, further comprising after causing the workstation instance to modify the asset file, displaying, in the asset-viewing window, a screen capture of the first remote application.

8. The computer-implemented method of any of clauses 1-7, further comprising displaying, by the endpoint device in a remote application window, a notification associated with a second asset included in the asset-viewing window, where the remote application window is separate from the asset-viewing window.

9. The computer-implemented method of any of clauses 1-8, where the workstation instance is running a second remote application simultaneously with the first remote application.

10. The computer-implemented method of any of clauses 1-9, further comprising displaying a contextual menu that displays at least a portion of a set of two or more available actions associated with the user input, where the set of two or more available actions are included in the context.

11. In various embodiments, one or more non-transitory computer-readable media store instructions that, when executed by one or more processors, cause the one or more processors to perform the steps of receiving, at an endpoint device, a user input associated with a first remote application running on a workstation instance associated with the user, determining, based on a context associated with the user input, a first asset associated with the user input, and causing the workstation instance to modify an asset file in a local file system of the workstation instance, where the asset file corresponds to at least a portion of the first asset.

12. The one or more non-transitory computer-readable media of clause 11, further comprising instructions that, when executed by the one or more processors, cause the one or more processors to perform the steps of transmitting, to a remote data store that is separate from the endpoint device and the workstation instance, a request for the first asset, where the request includes an asset identifier for the first asset, receiving the first asset from the remote, converting the asset to the asset file, and storing the asset file in the local file system of the workstation instance.

13. The one or more non-transitory computer-readable media of clause 11 or 12, further comprising instructions that, when executed by the one or more processors, cause the one or more processors to perform the steps of causing the workstation instance to update the asset file, and causing the remote data store to receive the updated asset file, where the data store modifies the first asset responsive to the updated asset file.

14. The one or more non-transitory computer-readable media of any of clauses 11-13, further comprising instructions that, when executed by the one or more processors, cause the one or more processors to perform the steps of displaying, by the endpoint device in an asset-viewing window, a thumbnail corresponding to the first asset, and displaying, in a remote application window, a notification associated with a second asset included in the asset-viewing window, where the remote application window is separate from the asset-viewing window.

15. The one or more non-transitory computer-readable media of any of clauses 11-14, where the user input comprises at least a portion of a drag-and-drop input that selects a thumbnail corresponding to the first asset, moves the thumbnail over an overlay area corresponding to a portion of a different window, and releases the thumbnail over the overlay area.

16. The one or more non-transitory computer-readable media of any of clauses 11-15, further comprising instructions that, when executed by the one or more processors, cause the one or more processors to perform the steps of displaying, by the endpoint device in an asset-viewing window, a thumbnail corresponding to the first asset, where the asset view includes a set of assets that are accessible by a group of users and updated by at least one user in the group of users.

17. In various embodiments, a system comprising a memory storing a remote workstation interface application, and a processor coupled to the memory that executes the remote workstation interface application by performing the steps of receiving, at an endpoint device, a user input associated with a first remote application running on a workstation instance associated with the user, determining, based on a context associated with the user input, a first asset associated with the user input, and causing the workstation instance to modify an asset file in a local file system of the workstation instance, where the asset file corresponds to at least a portion of the first asset.

18. The system of clause 17, where the processor further executes the remote workstation interface application to perform the steps of transmitting, to a remote data store that is separate from the endpoint device and the workstation instance, a request for the first asset, where the request includes an asset identifier for the first asset, receiving the first asset from the remote, converting the asset to the asset file, and storing the asset file in the local file system of the workstation instance.

19. The system of clause 17 or 18, where the processor further the remote workstation interface application to perform the steps of causing the workstation instance to update the asset file, and causing the remote data store to receive the updated asset file, wherein the data store modifies the first asset responsive to the updated asset file.

20. The system of any of clauses 17-19, where the processor is further configured to perform the steps of displaying, by the endpoint device in an asset-viewing window, a thumbnail corresponding to the first asset, and displaying, in a remote application window, a notification associated with a second asset included in the asset-viewing window, wherein the remote application window is separate from the asset-viewing window.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
    receiving, at an endpoint device, a user input associated with a first remote application running on a workstation instance associated with the user, wherein the user input is received through an interface layer displayed within an interface generated at the endpoint device, and wherein the interface layer provides a context associated with the user input for interacting with the first remote application operating on the workstation instance, and wherein the context comprises at least data associated with one or more selected assets and corresponding actions for manipulating the one or more selected assets;
    determining, based on the context associated with the user input, a first asset associated with the user input; and
    causing the workstation instance to modify an asset file in a local file system of the workstation instance, wherein the asset file corresponds to at least a portion of the first asset.

2. The computer-implemented method of claim 1, wherein the context includes an asset identifier for the first asset.

3. The computer-implemented method of claim 1, wherein modifying the asset file comprises:
    receiving the first asset from a remote data store that is separate from the endpoint device and the workstation instance;
    converting the asset to the asset file; and
    storing the asset file in the local file system of the workstation instance.

4. The computer-implemented method of claim 3, further comprising:
    causing the workstation instance to update the asset file; and
    causing the remote data store to receive the updated asset file, wherein the data store modifies the first asset responsive to the updated asset file.

5. The computer-implemented method of claim 1, wherein the user input comprises at least a portion of a drag-and-drop input that selects a thumbnail corresponding to the first asset.

6. The computer-implemented method of claim 1, further comprising:
    displaying, by the endpoint device in an asset-viewing window, a thumbnail corresponding to the first asset.

7. The computer-implemented method of claim 6, further comprising:
    after causing the workstation instance to modify the asset file, displaying, in the asset-viewing window, a screen capture of the first remote application.

8. The computer-implemented method of claim 6, further comprising:
    displaying, by the endpoint device in a remote application window, a notification associated with a second asset included in the asset-viewing window,
    wherein the remote application window is separate from the asset-viewing window.

9. The computer-implemented method of claim 1, wherein the workstation instance is running a second remote application simultaneously with the first remote application.

10. The computer-implemented method of claim 1, further comprising:
    displaying a contextual menu that displays at least a portion of a set of two or more available actions associated with the user input, wherein the set of two or more available actions are included in the context.

11. One or more non-transitory computer-readable media storing instructions that, when executed by one or more processors, cause the one or more processors to perform the steps of:
    receiving, at an endpoint device, a user input associated with a first remote application running on a workstation instance associated with the user, wherein the user input is received through an interface layer displayed within an interface generated at the endpoint device, and wherein the interface layer provides a context associated with the user input for interacting with the first remote application operating on the workstation instance, and wherein the context comprises at least data associated with one or more selected assets and corresponding actions for manipulating the one or more selected assets;
    determining, based on a context associated with the user input, a first asset associated with the user input; and
    causing the workstation instance to modify an asset file in a local file system of the workstation instance, wherein the asset file corresponds to at least a portion of the first asset.

12. The one or more non-transitory computer-readable media of claim 11, further comprising instructions that, when executed by the one or more processors, cause the one or more processors to perform the steps of:
    transmitting, to a remote data store that is separate from the endpoint device and the workstation instance, a request for the first asset, wherein the request includes an asset identifier for the first asset;
    receiving the first asset from the remote;
    converting the asset to the asset file; and
    storing the asset file in the local file system of the workstation instance.

13. The one or more non-transitory computer-readable media of claim 11, further comprising instructions that, when executed by the one or more processors, cause the one or more processors to perform the steps of:
    causing the workstation instance to update the asset file; and
    causing the remote data store to receive the updated asset file, wherein the data store modifies the first asset responsive to the updated asset file.

14. The one or more non-transitory computer-readable media of claim 11, further comprising instructions that, when executed by the one or more processors, cause the one or more processors to perform the steps of:
    displaying, by the endpoint device in an asset-viewing window, a thumbnail corresponding to the first asset; and displaying, in a remote application window, a notification associated with a second asset included in the asset-viewing window, wherein the remote application window is separate from the asset-viewing window.

15. The one or more non-transitory computer-readable media of claim 11, wherein the user input comprises at least a portion of a drag-and-drop input that:
  selects a thumbnail corresponding to the first asset;
  moves the thumbnail over an overlay area corresponding to a portion of a different window; and
  releases the thumbnail over the overlay area.

16. The one or more non-transitory computer-readable media of claim 11, further comprising instructions that, when executed by the one or more processors, cause the one or more processors to perform the steps of:
  displaying, by the endpoint device in an asset-viewing window, a thumbnail corresponding to the first asset, wherein the asset view includes a set of assets that are accessible by a group of users and updated by at least one user in the group of users.

17. A system comprising:
  a memory storing a remote workstation interface application; and
  a processor coupled to the memory that executes the remote workstation interface application by performing the steps of:
    receiving, at an endpoint device, a user input associated with a first remote application running on a workstation instance associated with the user, wherein the user input is received through an interface layer displayed within an interface generated at the endpoint device, and wherein the interface layer provides a context associated with the user input for interacting with the first remote application operating on the workstation instance, and wherein the context comprises at least data associated with one or more selected assets and corresponding actions for manipulating the one or more selected assets;
    determining, based on the context associated with the user input, a first asset associated with the user input; and
    causing the workstation instance to modify an asset file in a local file system of the workstation instance, wherein the asset file corresponds to at least a portion of the first asset.

18. The system of claim 17, wherein the processor further executes the remote workstation interface application to perform the steps of:
  transmitting, to a remote data store that is separate from the endpoint device and the workstation instance, a request for the first asset, wherein the request includes an asset identifier for the first asset;
  receiving the first asset from the remote;
  converting the asset to the asset file; and
  storing the asset file in the local file system of the workstation instance.

19. The system of claim 17, wherein the processor further the remote workstation interface application to perform the steps of:
  causing the workstation instance to update the asset file; and
  causing the remote data store to receive the updated asset file, wherein the data store modifies the first asset responsive to the updated asset file.

20. The system of claim 17, wherein the processor is further configured to perform the steps of:
  displaying, by the endpoint device in an asset-viewing window, a thumbnail corresponding to the first asset; and
  displaying, in a remote application window, a notification associated with a second asset included in the asset-viewing window, wherein the remote application window is separate from the asset-viewing window.

\* \* \* \* \*